W. D. McCAUSLAND.
TROLLEY WIRE GUARD.
APPLICATION FILED FEB. 3, 1915.
1,201,321.
Patented Oct. 17, 1916.
2 SHEETS—SHEET 1.
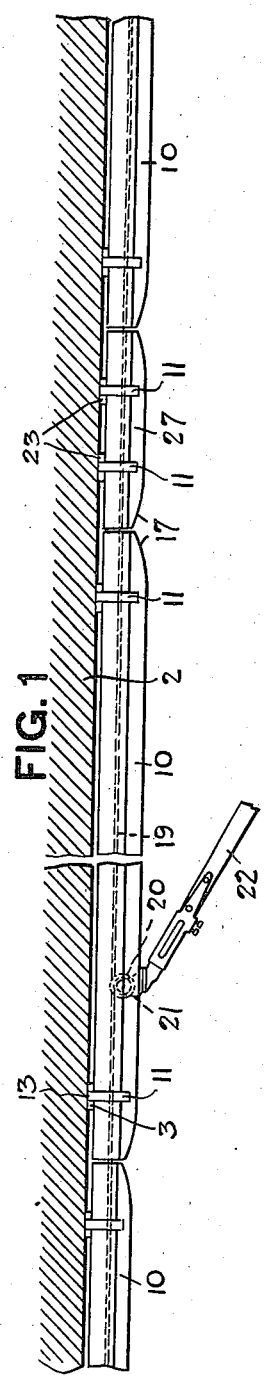
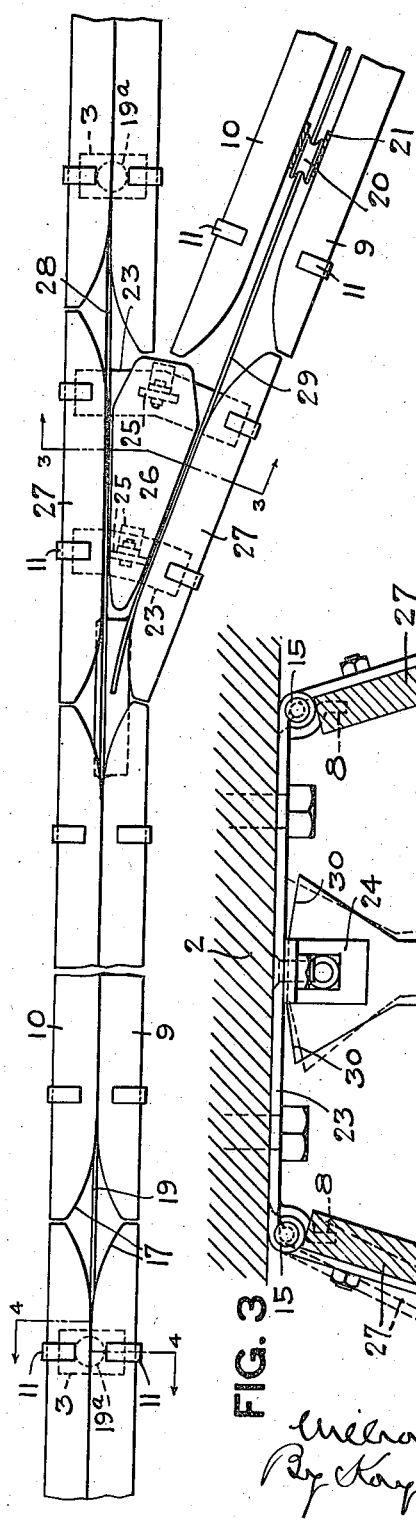
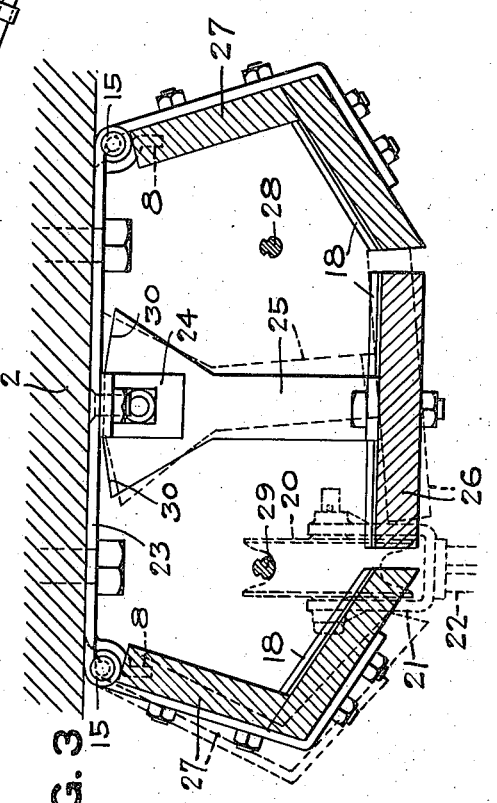
WITNESSES
J. R. Keller
John F. Will
INVENTOR
William D. McCausland
By Kay Totten & Powell
Attys W. D. McCAUSLAND.
TROLLEY WIRE GUARD.
APPLICATION FILED FEB. 3, 1915.

1,201,321.

Patented Oct. 17, 1916.
2 SHEETS—SHEET 2.

WITNESSES
J. R. Keller
John F. Will

INVENTOR
William D. McCausland
By Kay Totten Powell
Attys

UNITED STATES PATENT OFFICE.

WILLIAM D. McCAUSLAND, OF PITTSBURGH, PENNSYLVANIA.

TROLLEY-WIRE GUARD.

1,201,321.

Specification of Letters Patent.

Patented Oct. 17, 1916.

Application filed February 3, 1915. Serial No. 5,933.

*To all whom it may concern:*

Be it known that I, WILLIAM D. McCAUSLAND, a citizen of the United States, and a resident of Pittsburgh, in the county of Allegheny and State of Pennsylvania, have invented a new and and useful Improvement in Trolley-Wire Guards; and I do hereby declare the following to be a full, clear, and exact description thereof.

My invention relates to a trolley-wire guard.

The object of my invention is to provide a device of this character for use in mines, quarries, tunnels, bridges, etc., for protecting persons and animals from injury or death by preventing their coming in contact with the trolley-wires where electric current of any voltage is used for motive power.

To these ends my invention comprises, generally stated, a means of inclosing the overhead trolley-wire or conductor so that a person cannot accidentally come in contact with the conductor, while at the same time provision is made for the free movement of the trolley-pole by the separation of the inclosing means sufficiently to permit the passage of the trolley wheel, harp and trolley-pole, the device operating automatically and completely closing up as the trolley-pole moves along, whereby there is no liability of a person or animal coming in contact with the conductor and being injured or killed thereby.

Figure 4:
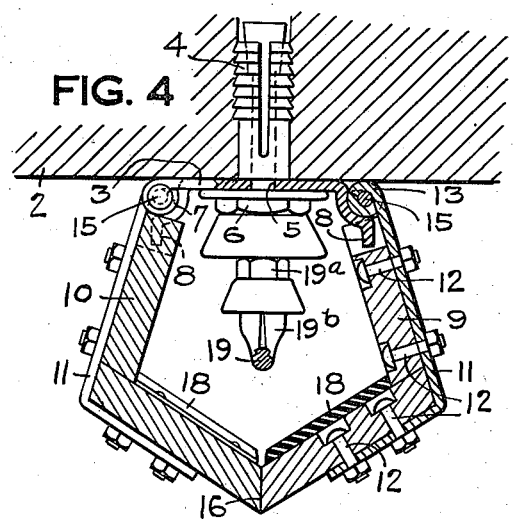
Figure 5:
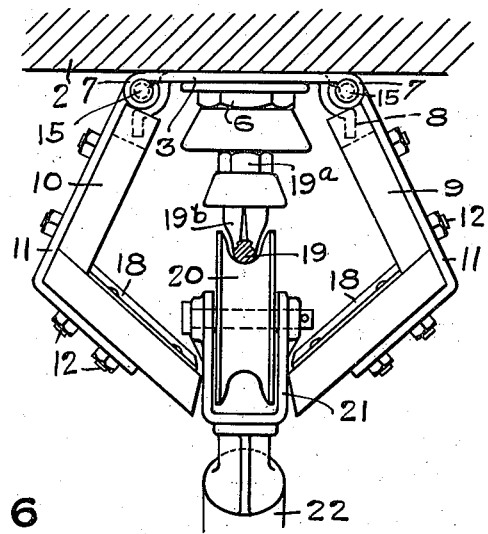
Figure 6:
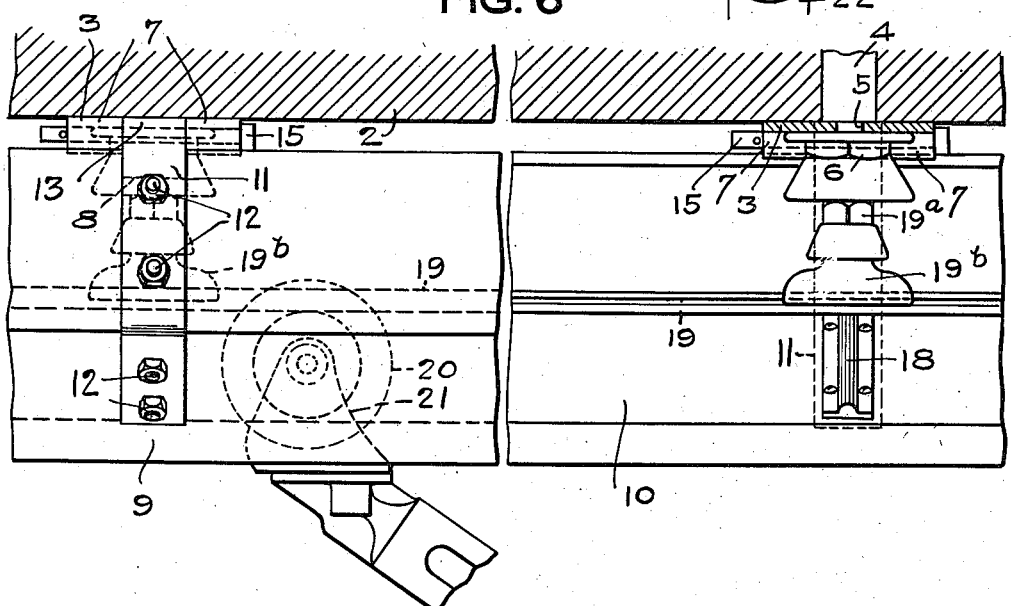
Figure 7:
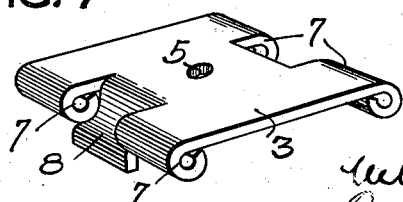

In the drawings, Figure 1 illustrates a longitudinal view of the roof of a portion of the mine or tunnel, showing my improved guard adapted thereto; Fig. 2 is a plan view looking from below and showing the manner of protecting at the frogs or switches; Fig. 3 is an enlarged sectional view on the line 3—3, Fig. 2; Fig. 4 is an enlarged sectional view on the line 4—4, Fig. 2; Fig. 5 is an end view showing the trolley wheel moving along the conductor; Fig. 6 is a longitudinal view cut away, the right end of the view showing one of the protecting or inclosing members removed; and Fig. 7 is a detail of one of the hinged plates.

I have illustrated my invention in connection with its application to a mine, although as above stated, it may be applied to other situations with equal advantage.

The numeral 2 designates the roof of a mine. The hinge-plates 3 are secured to the roof of the mine at suitable intervals by means of a suitable expansion bolt 4, which passes through the opening 5 in the hinge-plate and a nut 6 on said bolt holds the hinge-plate securely in position. The hinge-plate, as indicated in Fig. 7, has the hinge-portions 7 at each end thereof. A tongue 8 is cut out of the hinge-plate and extends downwardly to form a stop for the guard-sections, as will more fully hereinafter appear.

The safety guard-sections 9 and 10 may be composed of wood or other suitable material, such as fiber or other non-conductor, although the upper sections of said guards can be made of wood without danger, as there is no opportunity for the conductor to come in contact with this upper section. The hinge-plates 11 are secured to the guard-sections by counter-sunk bolts 12 and these hinge-plates have the hinge-portions 13 which engage the hinge-portions 7 of the hinge-plate 3 and a bolt 15 passes through the hinge-portions 7 and 13, as clearly indicated in Fig. 6. In this manner the guards 9 and 10 are free to swing to or from each other, but by gravity naturally swing toward each other, so as to form, under normal conditions, a closed chamber, as indicated in Fig. 4, the lower edges of the guard-sections abutting as at 16. The tongues 8 act as a stop for the inward movement of the guard-sections. These guard-sections are made in suitable lengths and at their ends they are cut away as at 17 to provide for the separating of the said guard-sections by the advancing trolley-pole.

Where the lower members of the guard-sections are made of wood the inner faces may be protected by insulator-strips 18, which cover the bolt-heads 12, and in case the conductor should for any reason become detached, it will rest upon the insulator-strips 18 and be insulated thereby, so as to prevent accident.

To avoid the charging of the lower boards of the guard sections when the trolley wheel and harp pass between them carrying the current to the motors, these lower boards are treated with special preparation of linseed oil and shellac which makes them waterproof and absolutely non-conductors. As above stated, fiberboard or other insulating materials may be used instead of the lower boards, if desired.

The conductor or trolley-wire 19 is supported in the ordinary manner from the expansion bolts 4 by the usual hanger 19ª and clamp 19$^b$, and the trolley wheel 20 engages said conductor, said trolley wheel being mounted in the harp 21 on the pole 22.

Where frogs are used the trolley-wires are protected on the two outer sides by swinging guard-sections 27 similar to those described above, suspended from roof hinge-plates 23 which extend across the space required for the frog, as clearly indicated in Fig. 3. From the center of these hinge-plates 23 are fastened the brackets 24 from which are suspended braces 25 carrying the board 26, which fills the space beneath the lower edges of the swinging guard-sections 27, thereby completely protecting the trolley-wires 28 and 29. These braces have shoulders 30 which are adapted to engage the hinge-plates 23 when this protecting board 26 is moved to either side to permit the trolley-wheel and harp to pass through, and said shoulders prevent its moving far enough to come in contact with either of the trolley-wires 28 or 29.

When my improved trolley-wire guard is in use, the trolley-wheel and harp on passing along the conductor 19 will separate the hinged guard-sections being guided therein by the tapered-off portions 17, and said guard-sections will also act to prevent the wheel from jumping off the trolley-wire or conductor. The guard-sections close automatically after the wheel has passed and form an inclosure around the trolley-wire, so that there is no liability of any person or animal coming into contact accidentally with the wire. When the trolley-wheel reaches a frog, the trolley-wheel will pass onto one or the other of the wires 28 or 29, and then passes between the guard-board 26 and one of the hinged guard-sections 27, as clearly indicated in Fig. 3, and when the frog has been passed, the parts close up again to make a complete inclosure around the trolley-wires.

By my invention, I provide a safety trolley-wire guard which forms a complete inclosure around the wire when the trolley-wheel is not moving over that particular section, and in the section that is being used, the parts are only separated sufficiently to allow the harp to pass between the swinging sections and the device still provides sufficient protection to prevent any accidental contact with the trolley-wires. As the trolley-wheel passes from section to section, the sections close automatically and the device being simple in construction, is not liable to get out of order.

What I claim is:

1. In a trolley-wire guard, the combination of an over-head conductor, swinging guard sections normally closed by gravity and abutting at their lower edges inclosing said conductor and adapted to swing away from said conductor when separated and adapted to swing from their normal position toward said conductor, and means limiting the inward movement of said swinging sections.

2. In a trolley-wire guard, the combination of an over-head conductor, a hinge plate, swinging guard sections carried by said plate, said sections normally closed by gravity and abutting at their lower edges inclosing said conductor, and adapted to swing away from said conductor when separated and to swing from their normal position toward said conductor, means carried by said plate whereby the inward movement of said sections is limited.

3. In a trolley-wire guard, the combination of an over-head conductor, a hinge-plate, abutting swinging guard sections carried by said plate, said sections normally closed by gravity inclosing said conductor and adapted to swing away from said conductor when separated and to swing from their normal position toward said conductor while in abutting engagement and a stop on the hinge plate limiting the inward movement of said guard sections.

4. In a trolley-wire guard, the combination of an over-head conductor, hinge plates, swinging guard sections having hinge straps connecting said plates, said guard sections normally closed by gravity and abutting at their lower edges inclosing said conductor and adapted to swing away from said conductor when separated and adapted to swing from their normal position toward said conductor while in abutting engagement, and a stop on the hinge plate adapted to engage said straps to limit said last named movement.

5. In a trolley-wire guard, the combination of an over-head conductor, swinging guard sections, and a movable guard section interposed between said swinging guard-sections.

6. In a trolley-wire guard, the combination of an over-head conductor, swinging guard-sections, depending arms, and a guard section carried thereby between said first named swinging guard-sections.

7. In a trolley-wire guard, the combination of an overhead conductor, swinging guard sections, a movable guard-section between said swinging sections, and means for limiting the movement of said intermediate guard-section.

In testimony whereof, I the said WILLIAM D. McCAUSLAND have hereunto set my hand.

WILLIAM D. McCAUSLAND.

Witnesses:
ROBT. D. TOTTEN,
JOHN F. WILL.